UNITED STATES PATENT OFFICE.

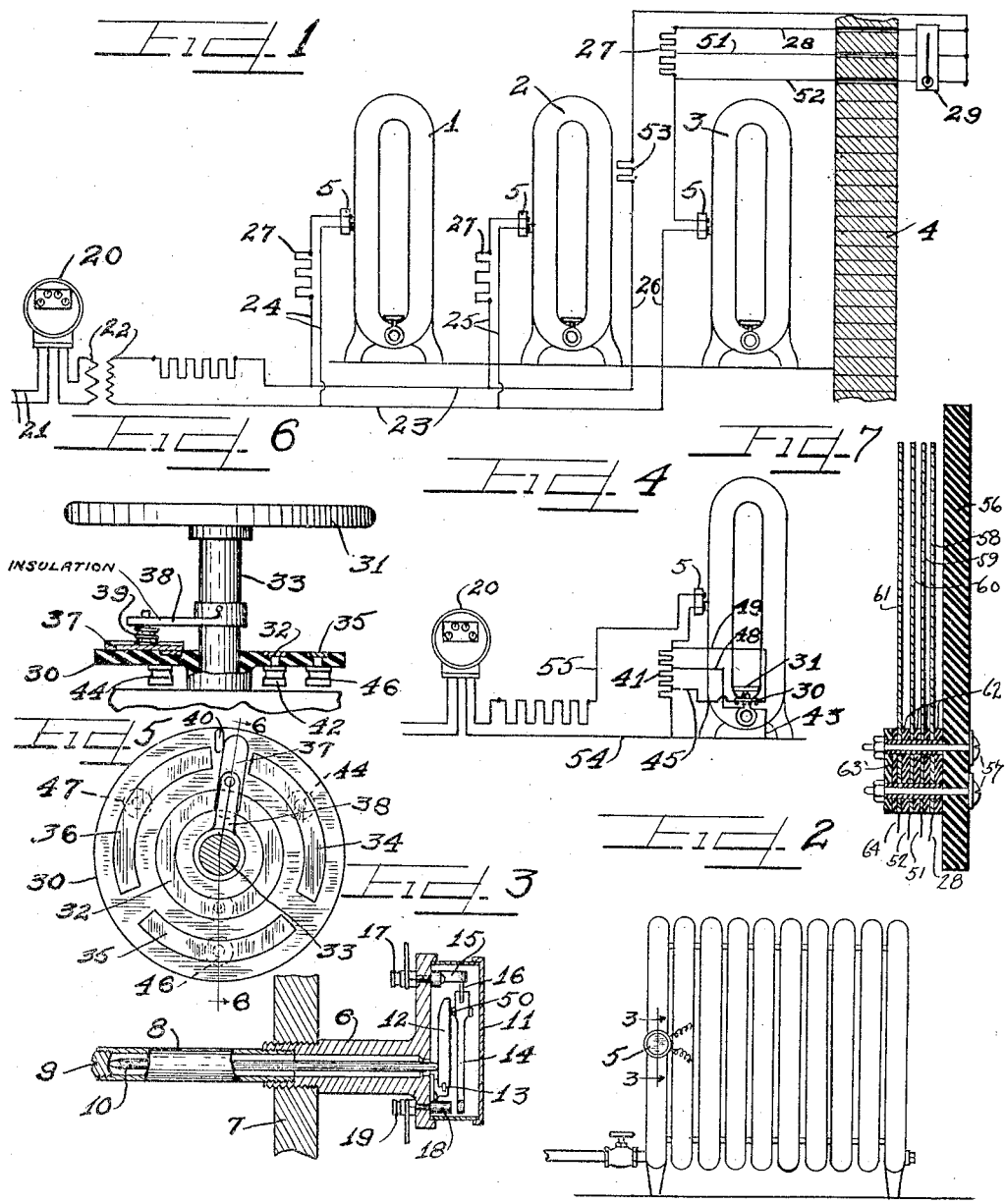

JOSEPH P. O'HERN, OF CHICAGO, ILLINOIS.

METHOD AND APPARATUS FOR MEASURING HEAT.

1,344,813.  Specification of Letters Patent.  Patented June 29, 1920.

Application filed May 29, 1918. Serial No. 237,211.

*To all whom it may concern:*

Be it known that I, JOSEPH P. O'HERN, a citizen of the United States, and a resident of the city of Chicago, in the county of Cook and State of Illinois, have invented certain Improvements in Methods and Apparatus for Measuring Heat; and I do hereby declare that the following is a full, clear, and exact description of the same, reference being had to the accompanying drawings, and to the numerals of reference marked thereon, which form a part of this specification.

In furnishing heat it is oftentimes desirable, for instance in a building occupied by a number of tenants, to ascertain the amount of heat used by the various tenants or consumers and to charge them according to the amount of heat which they use. Buildings are usually provided with radiators or other heat disseminating units in the different rooms of the building, which are arranged to be regulated by the occupant to give the amount of heat desired, the heat being usually turned on and off as may be required to maintain the desired temperature, and in order to measure the amount of heat consumed it is necessary to provide means which will automatically act when the heat is turned on and off and measure the amount of heat furnished during the period of use.

It is an object therefore of my invention to provide a device which operates in accordance with the heat consumed or used so as to register a measurement thereof.

It is a further object of my invention to provide a meter with connections to the various heating units or radiators whereby the operation of the meter is regulated in accordance with the amount of heat disseminated by the heating units.

Another object of my invention is to provide an electrically operated meter with electrical connections at the various radiators or heating units which are automatically operated by the temperature thereof to regulate the flow of current through the meter and thereby cause the meter to indicate the amount of heat consumed.

Another object of my invention is to provide an electrically operated meter and a switch and resistance element for each radiator or heating unit which is automatically controlled by the temperature thereof to regulate the flow of current through the meter and thereby cause the meter to indicate the amount of heat consumed.

Another object of my invention is to provide a step down transformer so that a current of the commonly furnished voltage may be used in the primary circuit and a low voltage current in the secondary circuit, the secondary circuit being provided with an automatic switch and resistance element for each radiator or heating unit for regulating the flow of current in the secondary circuit, and one of the circuits being provided with a meter, the operation of which is controlled by the flow of current in the secondary circuit so as to measure the amount of heat furnished to the various radiators or heating units.

Another object of my invention is to provide a heat measuring device with a compensating mechanism for varying the measurement of the heat consumed proportionately to the weather.

My invention also has other important objects which will appear from the following specification and the accompanying drawings, in which I have described and illustrated my invention in a preferred form.

On the drawings:

Figure 1 shows an installation embodying my improvements.

Fig. 2 is a side view of a radiator and thermostatic switch for controlling the registering mechanism.

Fig. 3 is an enlarged sectional view of the thermostatic switch on the line 3—3 of Fig. 2.

Fig. 4 is a diagrammatic view of a modified form of installation.

Fig. 5 is a top view of the switch mechanism with which the radiator valve is provided in the modified embodiment shown in Fig. 4.

Fig. 6 is a view partly in section on the line 6—6 of Fig. 5.

Fig. 7 is an enlarged longitudinal detail section of the compensating device.

As shown on the drawings:

1, 2 and 3 are radiators or heating elements of any suitable type and may be placed in the various rooms of a building, and 4 is an outside wall of the building in which the radiators are located. Each radiator is provided with a thermostatically operated switch 5, located preferably in the first coil of the radiator and which may be of any suitable form comprising a switch adapted to be placed in an electrical circuit and adapted to be closed when the temperature of the radiator reaches a certain point, and to be opened when the temperature falls below such point.

The switch shown in the drawings, and which is illustrated in detail in Fig. 3, comprises a sleeve 6, which has the threaded inner end thereof connected in the wall 7, of the radiator and a casing 11 at the outer end in which the switch mechanism is located. A tube 8, of copper or other material having a high coefficient of expansion, is connected to the inner end of the sleeve 6, and extends into the interior of the radiator coil when the sleeve 6, is attached to the radiator, and has an adjustable plug 9, at the inner end, and there is a stem 10, of a material having a low coefficient of expansion which at one end engages the plug, extends through the tube 8 and sleeve 6, and at the outer end engages the switch mechanism in the casing 11 so that the expansion and contraction of the tube 8 controls the opening and closing of the switch. This switch mechanism comprises a lever 12, which is pivoted at 13, so as to bear against the outer end of the stem 10, and a second lever 14 is secured to a bracket 15 by means of the spring 16, so that an intermediate projection or bearing 50 thereof, which is preferably near the attached end, is caused by the spring 16 to constantly bear against the upper or free end of the lever 12. With this construction the expansion and contraction of the tube 8 not only affords movement to the lever 14, but also gives the free end of the lever 14 a considerable degree of movement. A contact member 18 is insulated and provided with a terminal 19 for electrical connection and is positioned so as to be engaged by the free end of the lever 14, when it swings inwardly, and the lever 14 and its bracket 15 are also insulated and provided with a terminal 17 or otherwise constructed so as to afford an insulated connection between the terminals 17 and 19, which is closed and broken by the expansion and contraction respectively of the tube 8.

The measurement of heat consumed is furnished by means of an electric meter 20, which is placed in the primary circuit 21, of the step down transformer 22, the secondary circuit 23 of which has the thermostatic switches of the radiators 1, 2 and 3, connected therewith in parallel by means of the branch circuits 24, 25 and 26 respectively, the wires of which are connected to lead to and from the terminals 17 and 19 of the switches. In order to afford a difference in the flow of current proportional to the number of radiators in use, each branch circuit includes a resistance element 27, which preferably permits only a small amount of current to flow so that only a small amount of current is used, and by reason of the parallel arrangement of the branch circuits, the closing of any branch circuit switch increases the flow of current in the secondary circuit 23, and as the flow of current in the primary circuit 21 is proportional thereto the meter 20 affords a means whereby the amount of heat used may be measured or computed.

It sometimes occurs that a radiator is placed in an entrance hall or other location where it is rapidly cooled and in such case it will consume more heat than if in an inside room. Nevertheless unless some means is provided to compensate for this condition the measurement will be the same. In order to provide for such condition, I employ a compensating device 29 which is shown in connection with the resistance element 27 of the radiator 3. This device comprises a thermostatically controlled device which is mounted by bracket means on the outside of the building as shown in Fig. 1, and which is connected with the resistance element 27 so as to automatically cut out portions of such resistance as the temperature decreases so that the device will indicate a greater consumption of heat. As shown in Fig. 7, the thermostatic compensating device 29, embraces a back board, or mounting plate 56, having mounted on one side thereof by means of screw bolts 57, a plurality of upright flexible metal strips or bars 58, 59 and 60, and an upright thermostatic bar or plate 61. The metal strips and the thermostatic bar are separated from one another by insulating blocks 62, which engage over insulating sleeves 63, disposed on the supporting bolts 57. The wires 28, 51 and 52, are respectively connected to the lower ends of the metal strips 58, 59 and 60. A wire 64, connects the lower end of the thermostatic bar 61, to the resistance 53. For example, when the weather is warm the thermostatic element 61, bends or deflects inwardly to cause the upper ends of the metal strips to contact one another, so that current passes through the entire resistance element 27, the wire 28 at such time forming a part of the circuit. When, however, the temperature is reduced the thermostatic element 61, is partially retracted and the circuit through the wire 28 is interrupted and established through the strip 59 and the wire 51, thus cutting out a portion of the resistance 27, and upon a further decrease in temperature the thermostatic element 61, is further retracted and the circuit is established through the strip 60 and the wire 52 and the entire resistance element 27 is cut out, thus permitting a greater amount of current to flow and consequently the meter 20 will indicate a greater amount of heat consumed. It is necessary, however, that there should be some resistance in the branch circuit 26 when the element 27 is cut out, and the resistance element 53 is provided for this purpose, and is connected by means of the wire 64, to the thermostatic bar or plate 61, forming a part of the compensating device 29. The resistance 53, however, may form a part of the element 27 and the switch 29 would be arranged to retain a portion of the resistance element in the line even at the lowest temperature.

In the structure shown in Fig. 4, I have dispensed with the secondary circuit and have placed the meter and the automatic switch 5 in the same circuit. In addition I have provided a mechanism which is connected with the radiator valve to regulate the connection of a resistance element in the circuit so that the amount of resistance varies with the opening of the radiator valve. This mechanism comprises a stationary disk 30, preferably of insulating material, through which the stem 33 of the radiator valve 31 extends and turns, and it has on the upper surface a contact ring 32, concentric with the stem 33 of the radiator valve. Concentrically arranged around the ring 32 are a number of segments 34, 35 and 36, which, together with the ring 32, are adapted to be engaged by a contact shoe 37, carried by an arm 38 of the valve stem 33, to make the required connection between the ring 32 and the segments for controlling the resistance in the line, the said shoe being caused to make suitable contact by means of the spring 39, which is interposed between the end of the arm 38 and the shoe 37. A stop 40, is arranged to be engaged by the shoe 37, when the valve is closed and the first segment 34 terminates at the side of the shoe 37 when in such position so that the circuit is broken.

As the radiator valve is opened to admit a greater amount of steam to the radiator, the shoe 37 comes successively in contact with the segments 34, 35 and 36, and the resistance element 41, is connected therewith so that the resistance maintained in the line is decreased as the valve is opened, so that as the valve is opened the resistance will be proportionately eliminated and a greater amount of current will therefore be permitted to flow and the meter will accordingly indicate a greater amount of heat consumed.

The contact ring 32, which is continuously engaged by the shoe 37, has a terminal 42, which is connected by means of a wire 43, with the line wire 54, and the first segment 34, which comes in contact with the shoe 37, when the radiator valve is partially opened, has a terminal 44, which is connected by means of the conductor 45, with one end of the resistance element 41, the other end of which is connected through the switch 5 to the other wire 55 of the circuit. The segment 35 also has a terminal 46, which is connected with the resistance element 41 intermediate the ends thereof by means of the wire 48 so that when the valve is opened sufficiently so that the shoe contacts with the segment 35, a portion of resistance 41 will be cut out and a greater amount of current permitted to flow to cause the meter to indicate a greater amount of heat being consumed. The third segment 36 has a terminal 47, connected in the circuit by means of the wire 49 so that when the shoe 37 engages said segment the resistance element is entirely eliminated from the circuit and a correspondingly greater consumption of heat is indicated by the meter.

The operation is as follows:

In the first form in which my invention is illustrated the circuit 21 is preferably closed at all times, but by reason of its connection with the transformer 22, practically no current passes therethrough as long as the secondary circuit 23 is open. When, however, one of the switches indicated at 5 is closed by the heating of the radiator, the circuit is established and the meter 20 is caused to operate. As other radiators are turned on and the switches thereof are automatically closed, other branch circuits from the main circuit 23 are closed, and this has the effect of reducing the resistance proportionately to the number of branch circuits which are closed, and the meter 20 therefore registers a greater amount as additional branch circuits are closed.

The compensating device 29 which is shown in detail in Fig. 7 requires the current to pass through the entire resistance element when the temperature is normal, but as the temperature decreases at the exterior of the building the thermostatic compensating device 29 operates to cut out successive portions of the resistance element so as to permit a greater amount of current to flow through the line and a greater indication of heat consumed is therefore shown by the meter 20.

In the modified form of structure the automatic switch 5 and the switch controlled by the radiator valve may be used together as shown, or the radiator valve or automatic switch may be used separately as desired.

This system for determining the amount of heat used is applicable to radiators of various sizes and heating capacity by providing a resistance element for each radiator circuit which is proportional to the capacity of the radiator so that the operation of the meter will be effected in proportion to the actual heating capacity of the radiator. For example, a radiator of small capacity will have a resistance element, in the branch circuit therefor, having a greater resistance than is provided for a radiator having a greater capacity so that when the smaller radiator is turned on it will cause a less rapid operation of the meter than will the large radiator, and thus the heat measuring device may be made to indicate correctly the amount of heat used in the various installations.

While I have shown and described my invention in a preferred form, I am aware that various changes and modifications may be made without departing from the principles of my invention, and I therefore do not purpose limiting the patent granted hereon otherwise than necessitated by the prior art.

I claim as my invention:

1. The combination with a plurality of independently operable heating elements, of a meter for determining the amount of heat furnished thereby, automatically operable means for actuating the meter proportionately to the number of heating elements in operation and proportionately to the individual heating capability of each element, and means connected with said heating element for changing the resistance of the heating element in accordance with temperature changes.

2. The combination with a heating element of a meter for determining the amount of heat furnished thereby, automatically operable means projecting into the heating element and controlled by the supply of heat to the heating element for governing the operation of the meter, and compensating means for automatically varying the speed of the meter proportionately to varying conditions under which the heating element is operated.

3. In a heat measuring device the combination with a transformer of an electric circuit including an electrically operated meter connected in the primary circuit of the transformer, a plurality of independently operable heating elements, parallel branch circuits connected with the secondary transformer circuit and each having a resistance element therein, and automatic switches operated by the respective heating elements for opening and closing the branch circuits, for regulating the operation of the meter.

4. In a heat registering device the combination of an electric circuit including an electrically operated meter, a plurality of independently operable heating elements, a switch connected with each heating element for opening and closing the said circuit, and means connected with each switch for regulating the amount of current flowing in the circuit proportionately to the number of radiators in operation.

5. In a heat measuring device the combination of an electrical circuit including a meter, a heating unit having an automatic switch in said circuit for regulating the operation of the meter to measure the heat supplied by the heating element, a resistance element in said circuit, and a thermostatically operated device for decreasing the resistance of said resistance element in accordance with the decrease in temperature.

6. The combination with a plurality of independently operable heating elements, of an electrical circuit having a meter therein, a branch circuit for each heating element having a switch therefor at the heating element, a resistance element in each branch circuit for regulating the flow of current in proportion to the heating capacity of the heating element, and means for closing the switch when the heating element is in operation.

7. The combination with a plurality of independently operable heating radiators, of a step down transformer having a meter in the primary circuit and a plurality of parallel branch circuits in the secondary circuit, a resistance element in each secondary circuit proportional to the capacity of the radiator in the respective secondary circuit, and a switch on each radiator automatically controlled by the radiator.

In testimony whereof I have hereunto subscribed my name in the presence of two subscribing witnesses.

JOSEPH P. O'HERN.

Witnesses:
FRANK A. BREMER, Jr.,
FRED E. PAESLER.